US008885953B2

(12) United States Patent
Johnson

(10) Patent No.: US 8,885,953 B2
(45) Date of Patent: Nov. 11, 2014

(54) GRAIN EFFECT

(75) Inventor: Garrett M. Johnson, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 13/602,135

(22) Filed: Sep. 1, 2012

(65) Prior Publication Data

US 2014/0064635 A1  Mar. 6, 2014

(51) Int. Cl.
*G06K 9/36* (2006.01)
*G06K 9/46* (2006.01)

(52) U.S. Cl.
USPC .......................................................... 382/232

(58) Field of Classification Search
None
See application file for complete search history.

(56) References Cited

U.S. PATENT DOCUMENTS

| | | | | |
|---|---|---|---|---|
| 5,641,596 | A * | 6/1997 | Gray et al. | 430/21 |
| 5,739,922 | A * | 4/1998 | Matama | 358/447 |
| 6,445,831 | B1 * | 9/2002 | Arai | 382/254 |
| 7,215,813 | B2 | 5/2007 | Graves et al. | |
| 7,889,940 | B2 * | 2/2011 | Balram et al. | 382/254 |
| 8,564,696 | B2 * | 10/2013 | Okamura | 348/241 |
| 2003/0103057 | A1 | 6/2003 | Graves et al. | |
| 2004/0264795 | A1 * | 12/2004 | Fielding | 382/254 |
| 2009/0146961 | A1 * | 6/2009 | Cheung et al. | 345/172 |
| 2009/0204913 | A1 | 8/2009 | Kawano et al. | |
| 2010/0166335 | A1 * | 7/2010 | Balram et al. | 382/263 |
| 2011/0058224 | A1 * | 3/2011 | Saito et al. | 358/3.13 |
| 2012/0057808 | A1 * | 3/2012 | Minegishi et al. | 382/298 |
| 2012/0162479 | A1 * | 6/2012 | Okamura | 348/239 |

OTHER PUBLICATIONS

Peutz, Introducing Aviary, 2009, pp. 96-97. (http://link.springer.com/chapter/10.1007/978-1-4302-7200-7_3).*
Peutz, Mike, "Introducing Aviary," Chapter 3, Month Unknown, 2009, 7 pages, APRESS, New York, USA.

* cited by examiner

*Primary Examiner* — Bhavesh Mehta
*Assistant Examiner* — Feng Niu
(74) *Attorney, Agent, or Firm* — Adeli LLP

(57) ABSTRACT

For an image editing application, a tool in a graphical user interface (GUI) for making images appear grainy like older photographs is provided. The graininess effects tool blends a background grain image with a subject image. The visibility of graininess in the resulting final grainy image is controlled by the brightness in the subject image itself. The blending of the background grain image and the subject image includes (i) removing positive bias from the background grain image, (ii) performing multiplicative blending by multiplying the bias-removed background image with the subject image, and (iii) performing additive blending by adding the subject image with a weighted result of the multiplicative blending.

26 Claims, 11 Drawing Sheets

GRAIN EFFECT

BACKGROUND

Traditional analog photography created specific looks associated with the actual image reproduction technique. Over the years, people have become accustomed to these looks, and actually enjoy the "artifacts" of the system. One such artifact is image grain, especially for black and white photography. Grain is inherent to the analog photographic system, and is actually a visible artifact of the photosensitive capture molecules themselves. Despite the fact that grain is an artifact, it has a very distinctive look, and a look that many people wish to recreate in the digital photography world.

Simulation of image grain in the digital world is nontrivial, because digital photography has no film for any film grain to exist within. In digital cameras, the closest physical equivalents to film grain are the individual elements of the image sensor (e.g., a charge-coupled device ("CCD") cell). Unfortunately, pixels from a digital image sensor are organized in straight lines. These straight line artifacts may irritate the viewer more than the randomly arranged film grains.

An alternative to relying on digital image sensors as the source of image graininess is to apply a film grain overlay, which adds film noise characteristics to the digital image. However, overlaying film grain often affects dark and bright tonal regions of the digital image. For instance, superimposed graininess often alters the depth of black in the image and is disturbingly visible (appearing artificial) in the brighter tonal region of the image. As a result, the graininess created by simply overlaying film grain on the digital image is often not as visually pleasing as the film grain produced by traditional photography.

Therefore, there is a need for tools that digitally recreate the effect of film grain which is as visually pleasing and as similar to the film grain produced by traditional analog photography as possible.

SUMMARY

For an image editing application that allows users to edit and view images, some embodiments of the invention provide a tool to make images appear grainy. Some embodiments provide a graininess effects tool that blends a background grain image with a subject image. The visibility of graininess in the resulting final grainy image is controlled by the brightness in the subject image itself.

In some embodiments, blending the background grain image with the subject image involves (i) removing positive bias from the background grain image, (ii) performing multiplicative blending by multiplying the bias-removed background grain image by the subject image, and (iii) performing additive blending by adding the subject image to a weighted result of the multiplicative blending. Some embodiments perform the multiplicative blending and additive blending in order to ensure that the black regions in the resulting image appear grain-free. To control the visibility of graininess in the resulting final grainy image, some embodiments make graininess appear less visible in the brighter regions of the image than in the darker regions of the image.

Some embodiments provide a user interface for controlling the strength of the graininess that will appear in the resulting final grainy image. The user specified strength specifies a weighting factor which is applied to the result of the multiplicative blending before performing the additive blending.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Grainy Effect

For an image editing application that allows users to edit and view images, some embodiments of the invention provide a tool to make images appear grainy, like in older photographs. Some embodiments provide a graininess effects tool that blends a background grain image with a subject image.

The visibility of graininess in the resulting final grainy image is controlled by the brightness in the subject image itself.

In some embodiments, blending the background grain image with the subject image involves (i) removing positive bias from the background grain image, (ii) performing multiplicative blending by multiplying the bias-removed background grain image by the subject image, and (iii) performing additive blending by adding the subject image to a weighted result of the multiplicative blending. Some embodiments perform the multiplicative blending and additive blending in order to ensure that the black regions in the resulting image appear grain-free. To control the visibility of graininess in the resulting final grainy image, some embodiments make graininess appear less visible in the brighter regions of the image than in the darker regions of the image.

Figure 1:
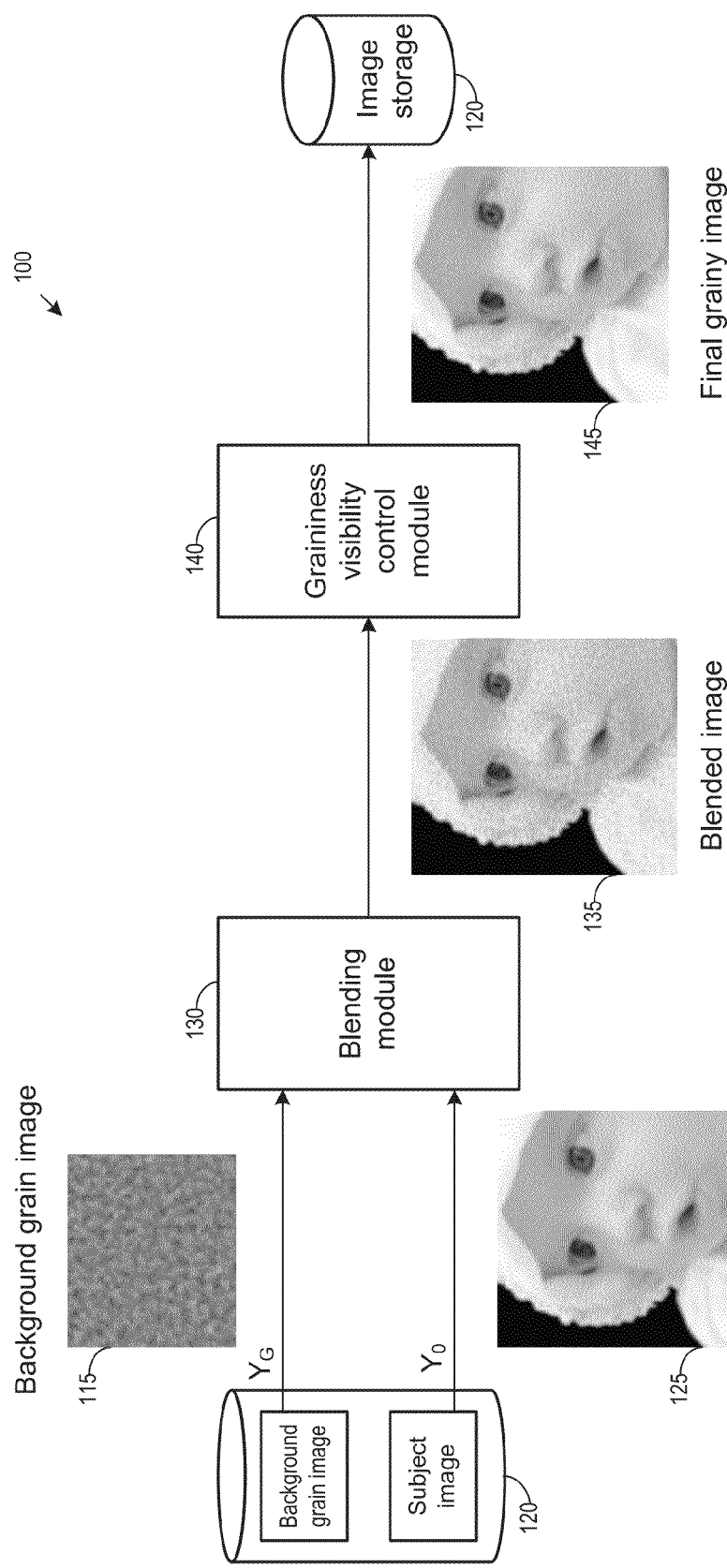
FIG. 1 illustrates an image editing application that applies grainy effect on a subject image.

For some embodiments, FIG. 1 illustrates an image editing application 100 that applies grainy effect on a subject image. Specifically, the application applies the grainy effect on the subject image by blending it with a background grain image and controlling the visibility of graininess based on the brightness of the subject image itself.

As illustrated, the image editing application 100 includes an image storage 120, a blending module 130, and a graininess visibility control module 140. The blending module 130 receives the background grain image 115 and the subject image 125 from the storage 120. The blending module 130 produces a blended image 135 for the graininess visibility control module 140, which outputs a final grainy image 145 to be stored in the image storage 120.

The image storage 120 stores and provides the subject image 125. The image editing application 100 retrieves the subject image 125 from the image storage 120. The image storage 120 can be a hard drive, a CD or DVD ROM, computer memory, other computers in a network, or any computer readable storage medium capable of storing digital data. In some embodiments, the application stores the resulting final grainy image 145 (which is output from the graininess visibility control module 140) in the image storage 120.

The image storage 120 also stores and provides the background grain image 115 that is to be blended with the subject image 125. The background grain image is the source of the graininess that is to appear in the final blended image 145. In some embodiments, the background grain image 115 is generated and stored in the storage 120 before any grainy effects operation is performed. In some embodiments, the image editing application 100 includes a graininess generation module (not shown) for generating the background grain image 115 based on a parameter specified by the user through a user interface ("UI"). In some embodiments, the background grain image is derived from samples of actual film grain taken from film.

In some embodiments, the pixel values in the background grain image 115 are all non-negative values (e.g., 0 to 255 or 0.0 to 1.0). This type of background grain image introduces a positive bias (with mean pixel value at or near 128 or 0.5). In some embodiments, the background grain image 115 in the storage 120 is free of bias. A bias-free background grain image can be the result of pre-processing. Such a pre-processed background grain image has both positively and negatively valued pixels and a mean pixel value of zero or approximately zero. Some embodiments generate a bias-free background grain image by calculating the mean pixel value of a raw (e.g., not previously processed for bias correction) background grain image and subtracting the mean pixel value from each pixel value of the raw background grain image.

The blending module 130 receives the background grain image 115 and the subject image 125 and blends the two images to create the blended image 135. In some embodiments, the blending of the two images involves both multiplicative blending and additive blending. In some embodiments, the blending module normalizes the image values and performs operations that remove positive bias from the background grain image.

The graininess visibility control module 140 produces the final grainy image 145 with the desired graininess. The graininess visibility control module 140 receives the blended image 135 from the blending module 130 and uses the brightness of the subject image 125 to control the visibility of the graininess in the final grainy image 145. The final grainy image 145 is then displayed (e.g., in a preview display area of a GUI) by the application 100. In some embodiments, the final grainy image 145 is stored in the image storage 120. The operations of the blending module 130 and the graininess visibility control module 140 will be further described below by reference to FIGS. 2 and 3.

Figure 2:
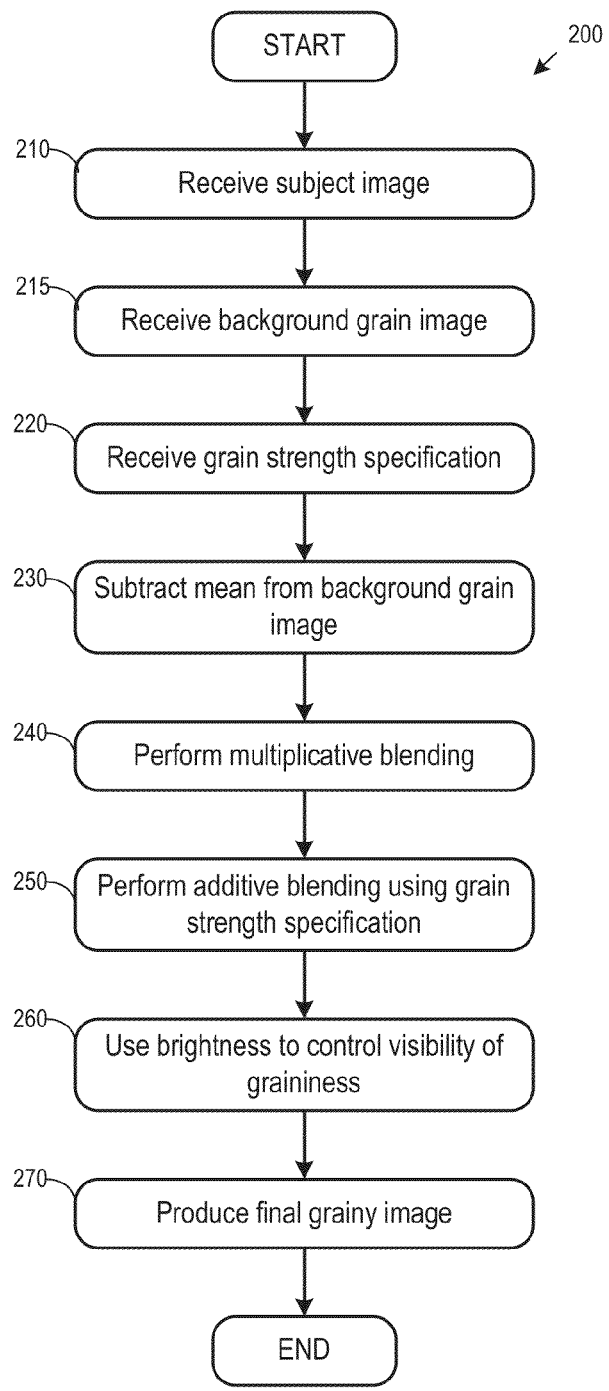
FIG. 2 conceptually illustrates a process that is used by an image editing application to generate a grainy version of a subject image.

For some embodiments, FIG. 2 conceptually illustrates a process 200 that is used by the image editing application 100 to generate a grainy version of a subject image. The process 200 creates the grainy effect by blending a background grain image with a black and white subject image (or the luminance component of a color subject image). In order to make the grainy appearance of the generated grainy image appear authentic (e.g., like the grain of a real film photograph), the process 200 also includes operations to reduce the visibility of the grainy effect in areas of the image that are very bright or very dark.

The process 200 starts by receiving (at 210) a subject image. In some embodiments, the subject image is a black and white image that only has luminance components. In some embodiments, the process receives a colored subject image and extracts the luminance component from the colored image.

The process next receives (at 215) a background grain image. In some embodiments, the pixel values of the background grain image 115 are all non-negative values (i.e., the background grain image has a positive bias). In some other embodiments, the background grain image 115 has been pre-processed such that the average pixel value of the background grain image is zero or approximately zero (i.e., the background grain image is bias free).

The process next receives (at 220) a grain strength specification. In some embodiments, the blending of the background grain image and the subject image is done with graininess from the background grain image weighted by a user selected strength factor. This strength factor can be a fixed number, or a number that is set by the user through a user interface of the image editing application. The greater the user chosen strength factor is, the more visible the grainy effect will be in the final blended image. Some embodiments use 1.0 as the default value for the user chosen strength factor.

Next, the process subtracts (at 230) the mean (calculated as the arithmetic mean or average of all pixel values) from all pixels of the background grain image. The process subtracts the mean value in order to eliminate or reduce positive bias. The average or mean pixel value of a positively valued background grain image is a positive value (e.g., near 128 or 0.5 if normalized). Blending such a background image directly with the subject image by simply adding their positively valued pixels together would introduce a positive bias, causing every pixel in the blended image to appear brighter than in the original subject image. In contrast, a background grain image with positive bias removed (i.e., mean subtracted) will have both positive valued pixels and negative valued pixels. The average pixel value of the bias-removed background grain image will be zero or approximately zero. Blending such a bias-free background grain image with the subject image would not cause the resulting blended image to appear too bright.

In some embodiments, the mean of the background grain image (i.e., 115) is predetermined and known to the process so the process need not compute the mean pixel value of the background grain image. In some embodiments, the background grain image retrieved by the image editing application already has the positive bias removed so the process does not need to remove bias (i.e., does not compute and subtract the mean from the background grain image).

The process next performs (at 240) multiplicative blending between the background grain image (e.g., bias-free background grain image) and the subject image. In some embodiments, this is a simple multiplication between the pixel values of the two images. Some embodiments calculate the multiplicative blending between the background grain image and the subject image as:

$$Y_1 = Y_0 \times (Y_G - \mu_G) \qquad (1),$$

where $Y_0$ represents the pixels of the subject image and $Y_1$ is the result of the multiplicative blending. $Y_G$ represents the pixels of the background grain image, and $\mu_G$ is the mean or average of the pixel values in the background grain image (hence, $Y_G - \mu_G$ represents the pixel values of the bias-free background grain image). Since the background grain image and the subject image are both black and white, only the luminance components of the pixel values (or image values) are used in some embodiments. Since dark regions have $Y_0$ values near 0, multiplicative blending reduces the visibility of graininess in darker region of the image (or eliminates the appearance of graininess in the darkest black region of the image where $Y_0$ has a value of 0).

The process next performs (at 250) additive blending between the subject image and the result of the multiplicative blending. In some embodiments, the result of the multiplicative blending at 240 is weighted by the user chosen strength received at 220. In some embodiments, the result of additive blending is calculated as:

$$Y_2 = Y_0 + Y_1 \times \text{userChosenStrength} \qquad (2),$$

where $Y_0$ represents the values of the pixels of the subject image (luminance component only), $Y_1$ represents the result of the multiplicative blend from operation 240, and userChosenStrength represents the user chosen strength of graininess.

Some embodiments perform both multiplicative blending and additive blending because performing only simple multiplicative blending would result in a blended image that is too dark, and performing only simple additive blending would result in image with undesirable graininess even in the black regions. By performing both additive and multiplicative blending, some embodiments are able to produce an image that has a deep rich grain-free black region while not being too dark or too bright. In some embodiments, the operations 240 and 250 are performed by a module similar to the blending module 130 of FIG. 1.

Next, the process uses (at 260) the brightness of the image to control the visibility of the graininess. In some embodiments, the graininess in the resulting image produced by operation 250 is still too visible in some regions of the image that are not totally dark. Thus, some embodiments further refine the result of the grainy effect by using the brightness of the image itself to control how much graininess is visible. Using the brightness of the image to control the visibility of graininess makes the graininess appear less visible in the brighter regions of the image. The final grainy image of the grainy effect operation is computed in some of these embodiments as:

$$Y_3 = Y_2 \times (1.0 - Y_0) + Y_0 \times Y_0 \qquad (3),$$

where $Y_0$ represents the pixel values of the subject image, and $Y_2$ is the result of the combined additive and multiplicative blend from operation 250. In some embodiments, the operation 260 is performed by a module similar to the graininess visibility control module 140 of FIG. 1.

After using the brightness of the subject image itself to control the visibility of the graininess in the blended image, the process produces (at 270) a final grainy image by outputting the result of operation 260. After producing the final grainy image, the process 200 ends.

In some embodiments, the operations 230-260 are not performed as distinct operations. Once given a subject image and a background grain image, some embodiments generate the final blended grainy image in one mathematical operation by incorporating equations (1) and (2) into equation (3). In some of these embodiments, the functions of the blending module 130 and the functions of the graininess visibility control module 140 are performed by one single module rather than by two distinct modules such as 130 and 140.

Figure 3:
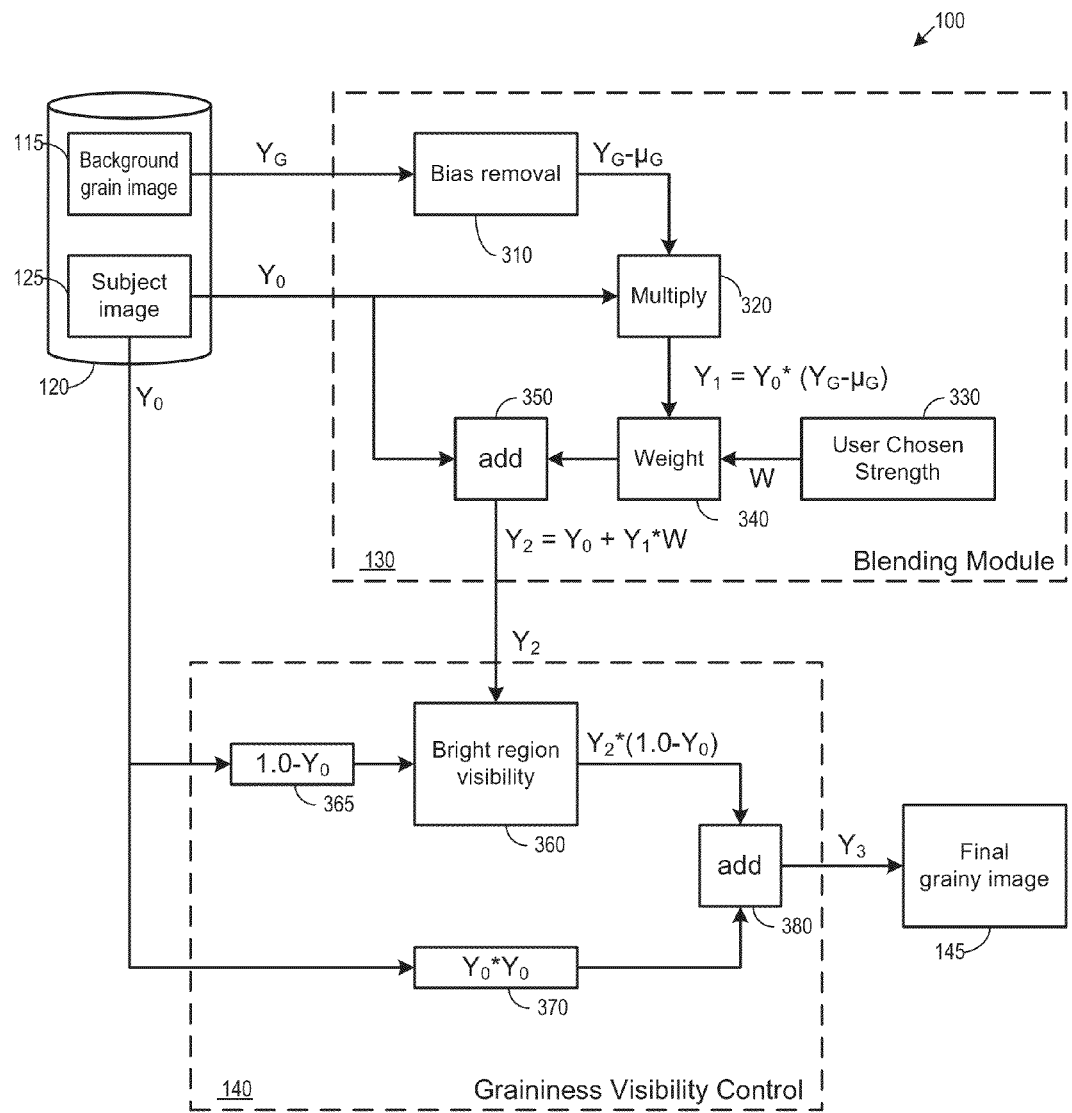
FIG. 3 illustrates a system that performs an operation for blending a grainy background image with a subject image and an operation for controlling the visibility of the grain in the blended image.

FIG. 3 illustrates the data flow of the blending operation and the graininess visibility control operation in the image editing application 100, which includes the blending module 130 and the graininess visibility control module 140. The blending module 130 receives the subject image 125 ($Y_0$) and the background grain image 115 ($Y_G$) from the image storage 120. The graininess visibility control module 140 receives the blended image ($Y_2$) from the blending module 130 and uses the brightness of the subject image ($Y_0$) to control the visibility of the graininess in a final blended image ($Y_3$).

The blending module 130 includes a bias removal module 310 that removes the positive bias from the background grain image by calculating the arithmetic mean of the background grain image ($\mu_G$) and subtracting the mean value from the pixel values of the background grain image. In some embodiments, the background grain image 115 in the image storage 120 has already been pre-processed to be bias free. The bias-free background grain image ($Y_G - \mu_G$) is then blended with the subject image by a multiplication module 320 that performs multiplicative blending. The result of the multiplicative blending is weighted by user chosen strength 330 in a weighting module 340 before being blended with the subject image again by an addition module 350 that performs additive blending. In some embodiments, the user chosen strength (W) can be adjusted by the user of the image editing application. The result of the additive blending ($Y_2 = Y_0 + Y_1 \times W$) is then sent to the graininess visibility control module 140.

The graininess visibility control module 140 includes a bright region visibility module 360 for reducing the visibility of graininess in lighter regions of the image by multiplying the blended image ($Y_2$) with the complement value of the subject image ($1.0 - Y_0$). The result is a graininess adjustment offset that is equal to $Y_2 \times (1.0 - Y_0)$. In this graininess adjustment offset, the darker regions of the image (i.e., where $Y_0$ is at or near 0.0) is already grain-free or near grain-free because of the multiplicative blending performed at 320, while the brighter regions of the image (i.e., where $Y_0$ is at 1.0 or near 1.0) would have reduced graininess visibility because of the $1.0 - Y_0$ factor. In some embodiments, the white region or the brightest regions of the final grainy image would appear grain free (just like the black region after the multiplicative blending). The graininess visibility control module 140 then adds this graininess adjustment offset to the square of the subject image ($Y_0 * Y_0$) in order to produce the final blended image ($Y_3$).

Figure 4:
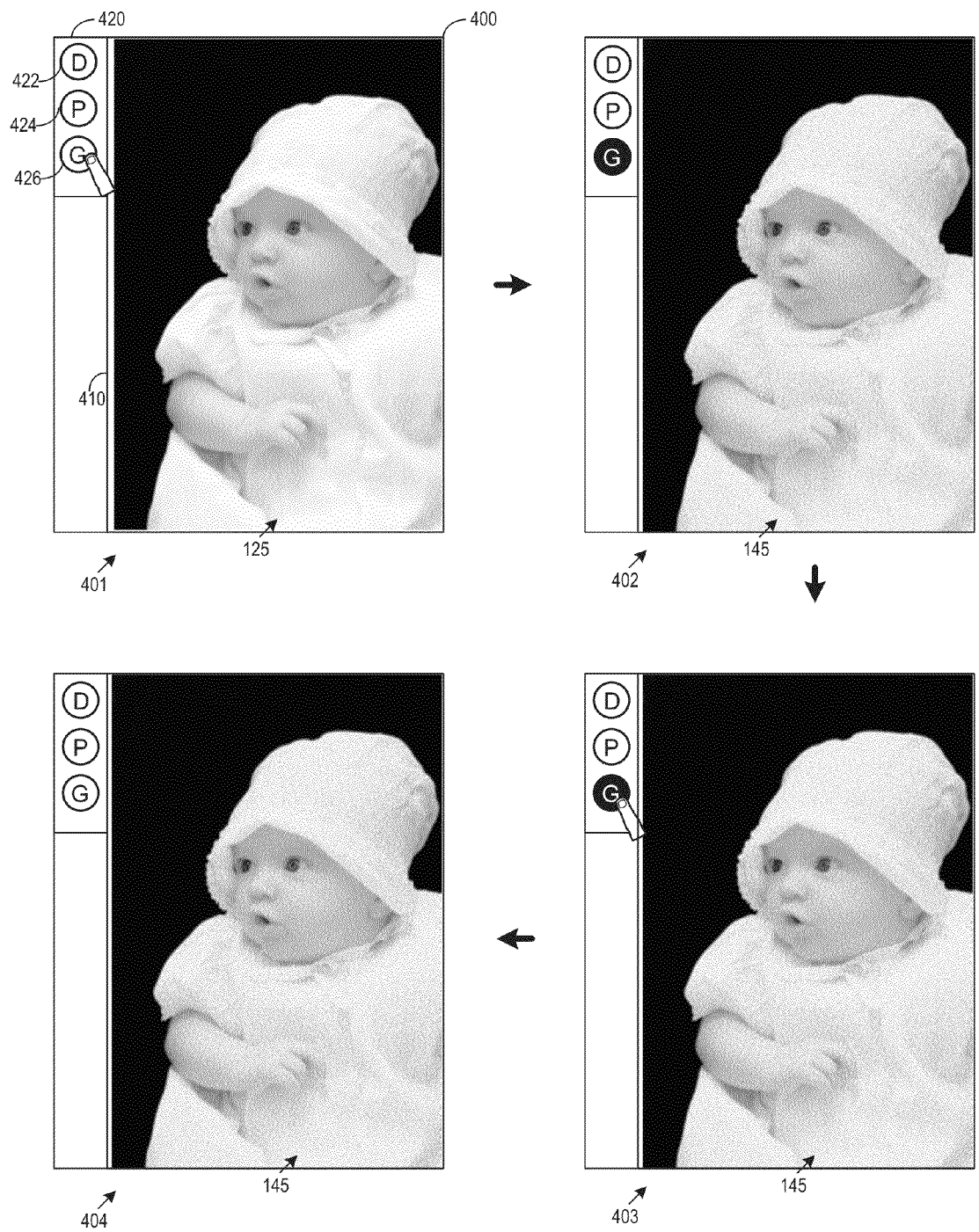
FIG. 4 illustrates an image editing application that provides a tool for applying grainy effect to an image.

For some embodiments, FIG. 4 illustrates an image editing application that provides a tool for applying the grainy effect. The tool, once activated, blends a background grain image with a black and white subject image (or the luminance component of a color subject image) to create a grainy version of the subject image. To make the resulting blended image appear more authentically grainy (e.g., similar to an actual grainy photograph), some embodiments include operations that make the grainy effect less visible in areas of the image that are very bright or very dark.

FIG. 4 illustrates the operation of applying the grainy effect in four different stages 401-404 of a graphical user interface (GUI) 400 of the image editing application. The image editing application includes the graphical user interface (GUI) 400, which supports image editing operations based on several different image effects. As shown in this figure, the GUI 400 includes an image viewing area 410 and an image effects menu area 420.

The image viewing area 410 allows the user to view the current state of an image being processed. In some embodiments, the image editing application displays an image in its original form inside the image viewing area 410 when the image is loaded from a storage medium into the application. Once a particular effect has been applied to the image, the user can view the resulting image in the image viewing area 410. In this example, the subject image 125 is currently loaded into the image editing application and displayed in the image viewing area 410.

The image effects menu area 420 includes a number of items that allow the user to activate various image effect tools. In the example of FIG. 4, the image effects menu 420 includes a duotone effect activation item 422, a painterly effect activation item 424, and a grain effect activation item 426. The grain effect activation item 426, when selected, activates the grain effect tool which allows the user to apply a grain effect on the image 125. Likewise, the painterly effect activation item 424 and the duotone effect activation item 422 activate tools that allow the user to apply painterly effect and duotone effect, respectively, to the image 125. In some embodiments, an activation item, such as the grain effect activation item 426, changes its appearance (e.g., becomes highlighted or changes color) when selected.

The four stages 401-404 of applying the grainy effect will now be described. The first stage 401 of FIG. 4 shows the GUI 400 and the image 125 before the application of the grainy effect. The image 125 has been loaded into the image editing application and is being displayed in the image viewing area 410. The image 125 can be an original source image that has not been altered by any effect or it can be an image that already has one or more effects applied. None of the activation items in the image effects menu area 420 are highlighted, indicating that none of the image effects are currently selected. The user is selecting the grainy effect activation item 426 for activating the grainy effects tool.

The second stage 402 shows the GUI 400 after the grainy effect activation item 426 has been selected. The grainy effect activation item 426 is highlighted, indicating that the grainy effects tool is active. The activation of the grainy effects tool also causes the image editing application to generate the grainy image 145 based on the subject image 125. The generation of the grainy image 145 is as described above by reference to FIG. 2. The generated grainy image 145 is illustrated in FIG. 4 as being previewed in the image viewing area 410.

The third stage 403 shows the user de-selecting the grainy effects activation item 426. The final stage 404 illustrates the GUI 400 after the de-selection of the grainy effects activation item 426. The grainy effects activation item 426 is no longer highlighted, indicating it has been unselected. The grain image 145 remains in the image viewing area 410 as the result of the grainy effect. The user is now free to apply other effects on the image 145 in addition to the grainy effect just applied.

Figure 5:
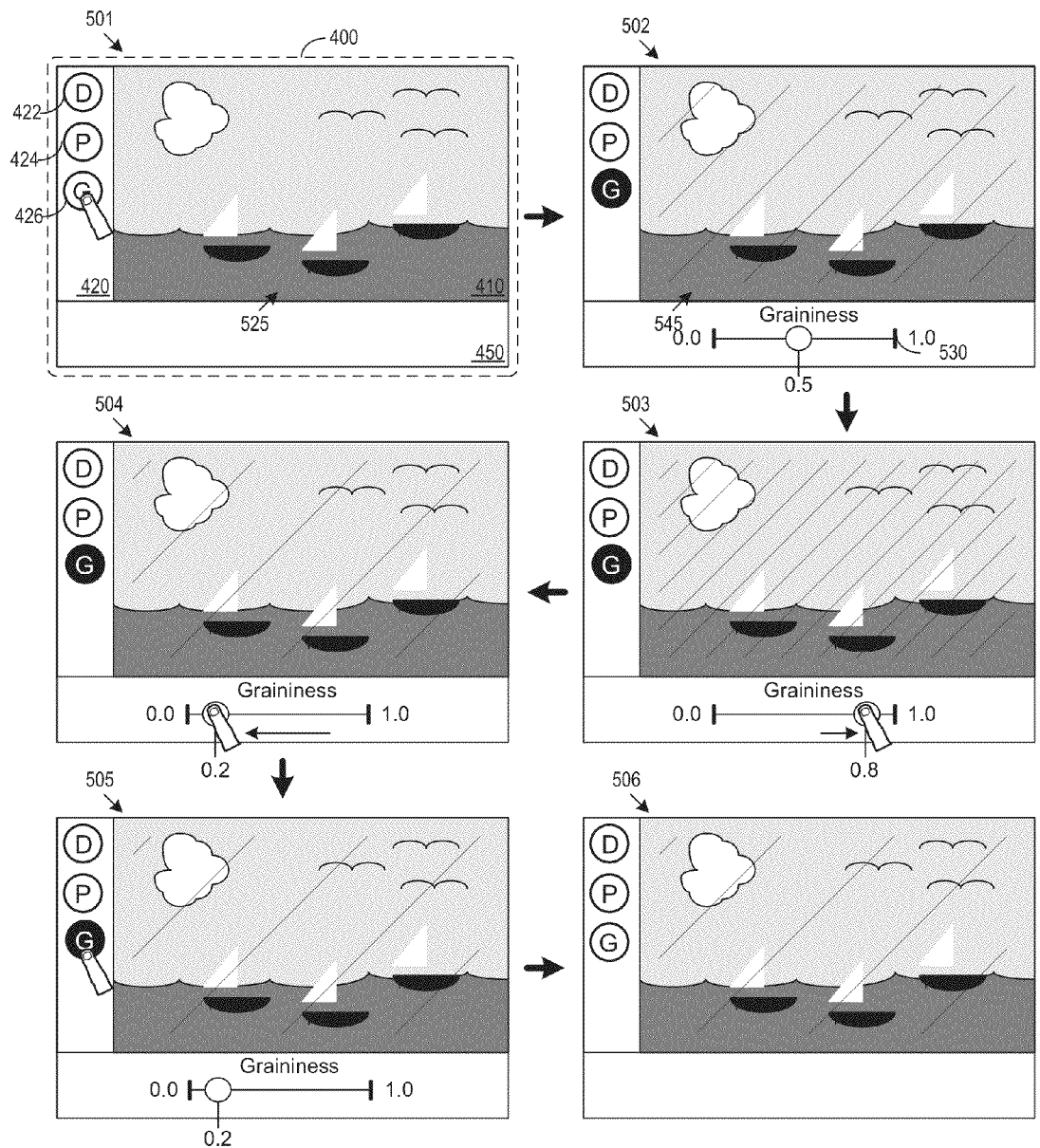
FIG. 5 illustrates a GUI having a graininess effects tool that allows a user to adjust a strength factor.

As mentioned above, the visibility of graininess in the final blended image can be controlled by the user chosen strength factor 330, which in some embodiment is adjustable by the user of the image editing application. FIG. 5 illustrates a graininess effects tool in the GUI 400 that allows adjustment of the user chosen strength factor.

FIG. 5 illustrates the adjustment of the user chosen strength factor in six different stages 501-506 of the GUI 400 of the image editing application. Just as in FIG. 4, the GUI 400 includes the image viewing area 410 and the image effects menu area 420. In addition, the GUI 400 includes an effects manipulation area 450. The image effects menu 420 includes several image effects activation items, including the duotone effect activation item 422, the painterly effect activation item 424, and the grain effect activation item 426. A subject image 525 is currently loaded into the image editing application and displayed in the image viewing area 410.

The image effects manipulation area 450 allows the user of the image editing application to input additional parameters for a given image effect operation. When one of the activation items (422, 424, or 426) is selected in the image effects menu area 420, one or more UI items, such as buttons, sliders, or dialog boxes, related to the selected activation item (422, 424, or 426) can appear in the image effects manipulation area 450. The user can manipulate these UI items to provide additional parameter specifications to the image editing application. For example, when the grain effect activation item 426 is selected, a grain strength adjustment slider 530 appears in the image effects manipulation area 450.

The six stages 501-506 of the operation to apply the grainy effect with the user adjusted strength factor will now be described. The first stage 501 shows the GUI 400 and the image 525 before the application of the grainy effect. The image 525 is loaded into the image editing application and is displayed in the image viewing area 410. None of the activation items in the image effects menu area 420 is highlighted, indicating that none of the image effects are currently selected. At this stage 501, a user is selecting the grainy effect activation item 426 for activating the grainy effects tool.

The second stage 502 shows the GUI 400 after the user has selected the grainy effect activation item 426. The activation of the grainy effects tool causes the image editing application to generate the grainy image 545 based on the subject image 525. The graininess appearing in this image is based on a default graininess strength. The activation of the grain effect tool also causes the grain strength adjustment slider 530 to appear in the effects manipulation area 450. The grain strength adjustment slider 530 allows the user to adjust the graininess strength factor to a value between 0.0 and 1.0. A user chosen strength of 0.0 would result in no graininess, while a user chosen strength of 1.0 allows most of the graininess from the background grain image 115 to appear in the final blended image. The slider 530 is currently positioned on a default graininess strength of 0.5.

The third stage 503 shows the user moving the slider toward 1.0, causing the graininess in the image to appear more visible due to the higher user chosen strength (0.8). The fourth stage 504 shows the user moving the slider toward 0.0, causing the graininess in the image to appear less visible due to the lower user chosen strength (0.2).

At the fifth stage 505, the user de-selects the graininess effects activation item 426. At the sixth stage 506, the grain strength adjustment slider 530 disappears, leaving an image with graininess at the user chosen strength of 0.2.

Figure 6:
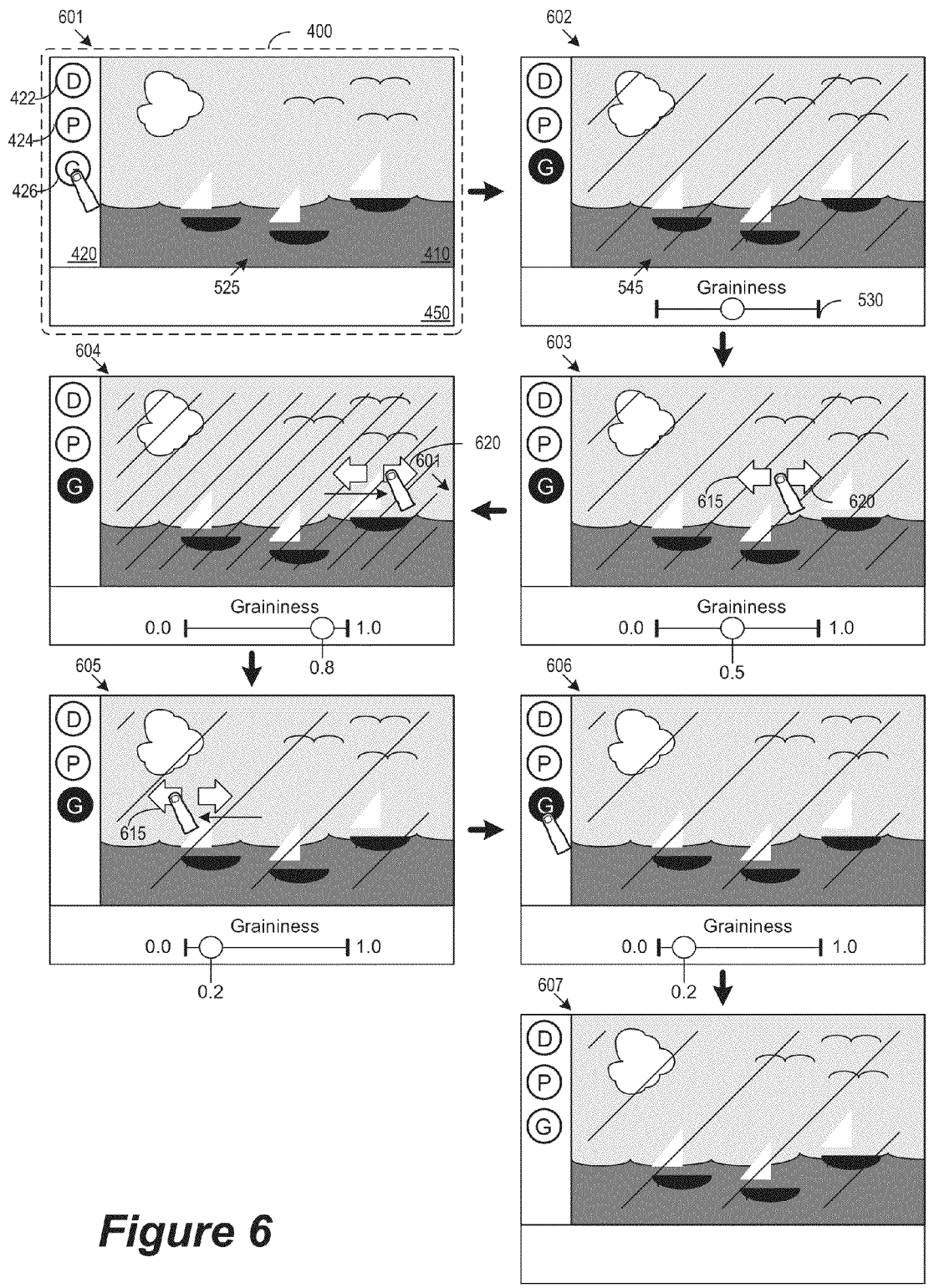
FIG. 6 illustrates a GUI having a graininess effects tool that allows a user to make on-image adjustments that adjust the strength of graininess by touching the image directly.

In some embodiments, the graininess effects tool allows the user to adjust the strength of graininess by touching the image directly. FIG. 6 illustrates such a graininess strength adjustment in seven stages 601-607 of the GUI 400.

The first stage 601 shows the GUI 400 and the image 525 before the application of the grainy effect. None of the activation items in the image effects menu area 420 are highlighted, indicating that none of the image effects are currently selected. The user is selecting the grainy effect activation item 426 for activating the grainy effects tool.

The second stage 602 shows the GUI 400 after the grainy effect activation item 426 has been selected. The activation of the grainy effects tool causes the image editing application to generate the grainy image 545 based on the subject image 525. The activation of the grainy effects tool also causes a graininess strength adjustment slider 530 to appear in the effects manipulation area 450.

At the third stage 603, instead of using the graininess strength adjustment slider 530 to change the strength of the graininess applied to the image, the user touches the image viewing area 410 directly, which causes a set of on-image UI controls 615 and 620 (displayed as two directional arrows along the horizontal axis) to appear for making graininess strength adjustments.

At the fourth stage 604, the user selects the right arrow 620, which causes the image editing application to select a higher user chosen strength for graininess (0.8 in this example). At the fifth stage 605, the user selects the left arrow, which causes the image editing application to select a lower user chosen strength for graininess (0.2 in this example).

At the sixth stage 606, the user de-selects the graininess effects activation item 426 in the image effects menu area 420. At the seventh stage 607, the grain strength adjustment slider 530 disappears, leaving a grainy image with graininess at the user chosen strength of 0.2.

II. Software Architecture

Figure 7:
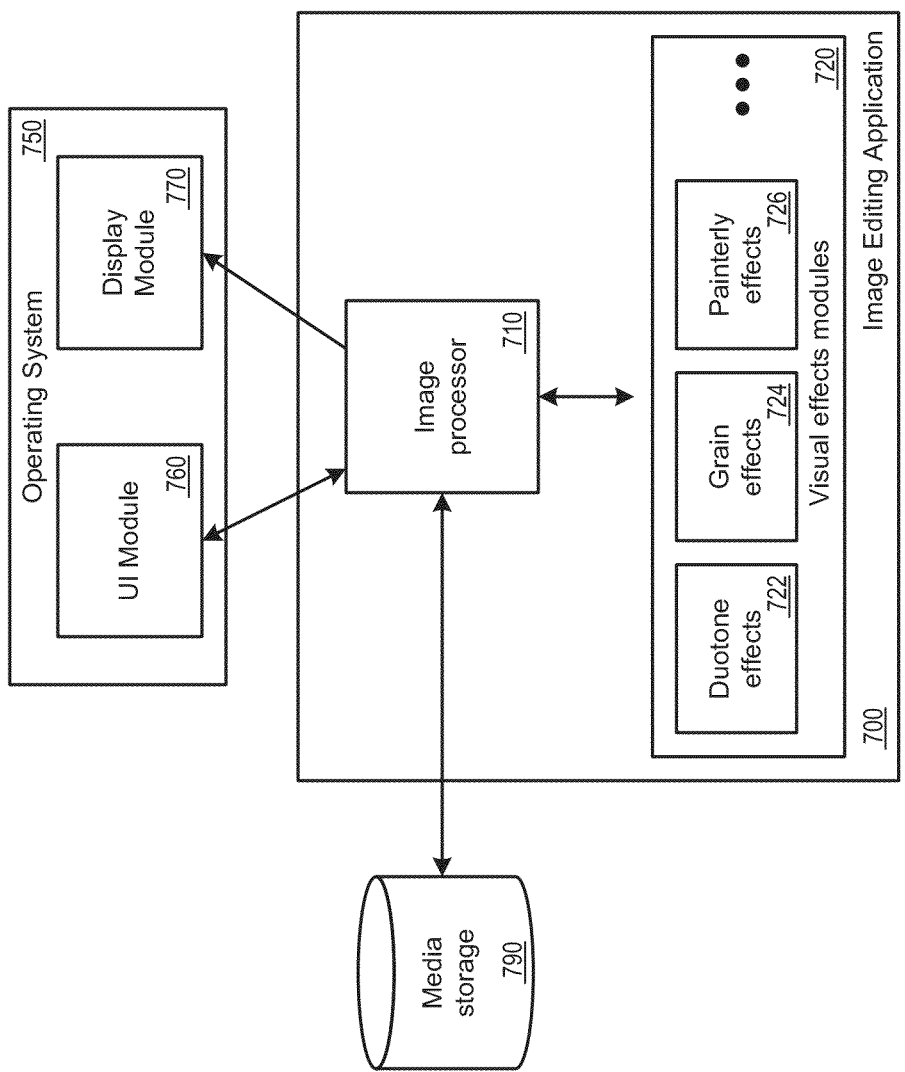
FIG. 7 illustrates a software architecture block diagram of an image editing application that applies different visual effects operations to an image.

FIG. 7 illustrates a software architecture block diagram of an image editing application 700 of some embodiments that applies different visual effects to an image. The different visual effects include duotone effect, grain effect, and painterly effect. As shown in FIG. 7, the image editing application 700 includes an image processor 710 and a visual effects module 720. The visual effects module 720 includes various specialized modules such as a duotone effects module 722, a grain effects module 724, and a painterly effects module 726. The image processor 710 interfaces with modules in the operating system 750, modules such as a UI module 760 and a display module 770. The image editing application 700 also accesses a media storage 790 for image storage and retrieval.

The image processor 710 retrieves images from the media storage 790 and uses the visual effects modules 720 to apply image effects to the retrieved images. When a user invokes a particular visual effects tool for a particular image, the UI module 760 informs the image processor 710. The image processor 710 in turn retrieves the particular image from the media storage 790, uses the visual effects modules 720 to apply the particular visual effects tool, and stores the altered image in the media storage 790. The image processor 710 also provides the images (before and/or after the visual effect is performed) to the UI module 760 and the display module 770 to be displayed as part of a GUI.

When the grain effect tool is invoked (e.g., by selecting the grain effects activation item 426 in the GUI), the image processor 710 performs a grain blending operation by using the grain effects module 724 to apply the grain effect. If necessary, the strength of the graininess (i.e., user chosen strength) is supplied to the image processor 710 by the UI module 760. The resulting image with the applied grain effect is given to the display module 770 for display. In some embodiments, the grain effects module 724 performs the process 200 to apply the grain effect. In some embodiments, the grain effects module 724 includes the blending module 130 and the graininess visibility control module 140.

III. Image Viewing, Editing, and Organization Application

Figure 8:
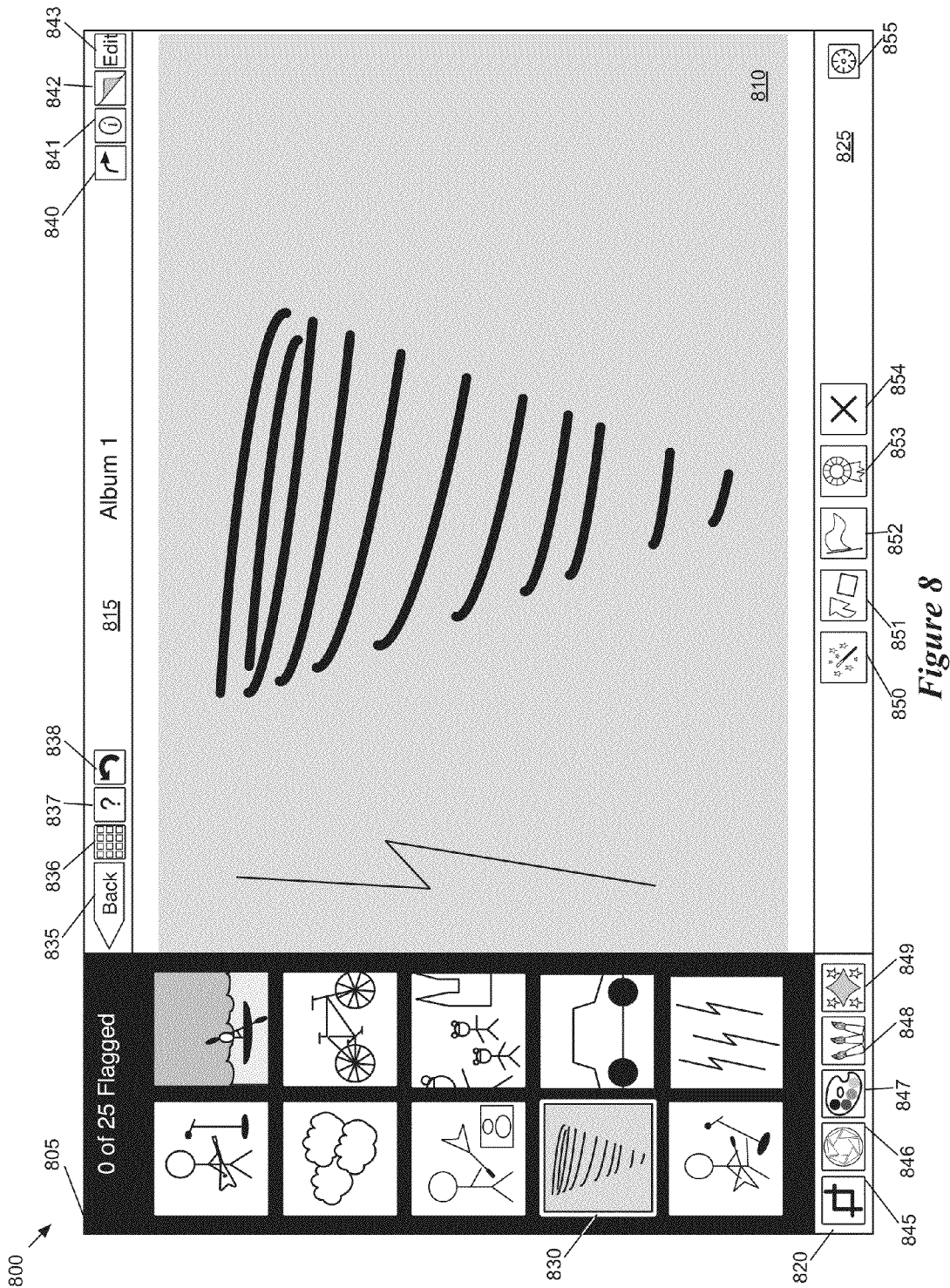
FIG. 8 illustrates a detailed view of a GUI for viewing, editing, and organizing images.
Figure 9:
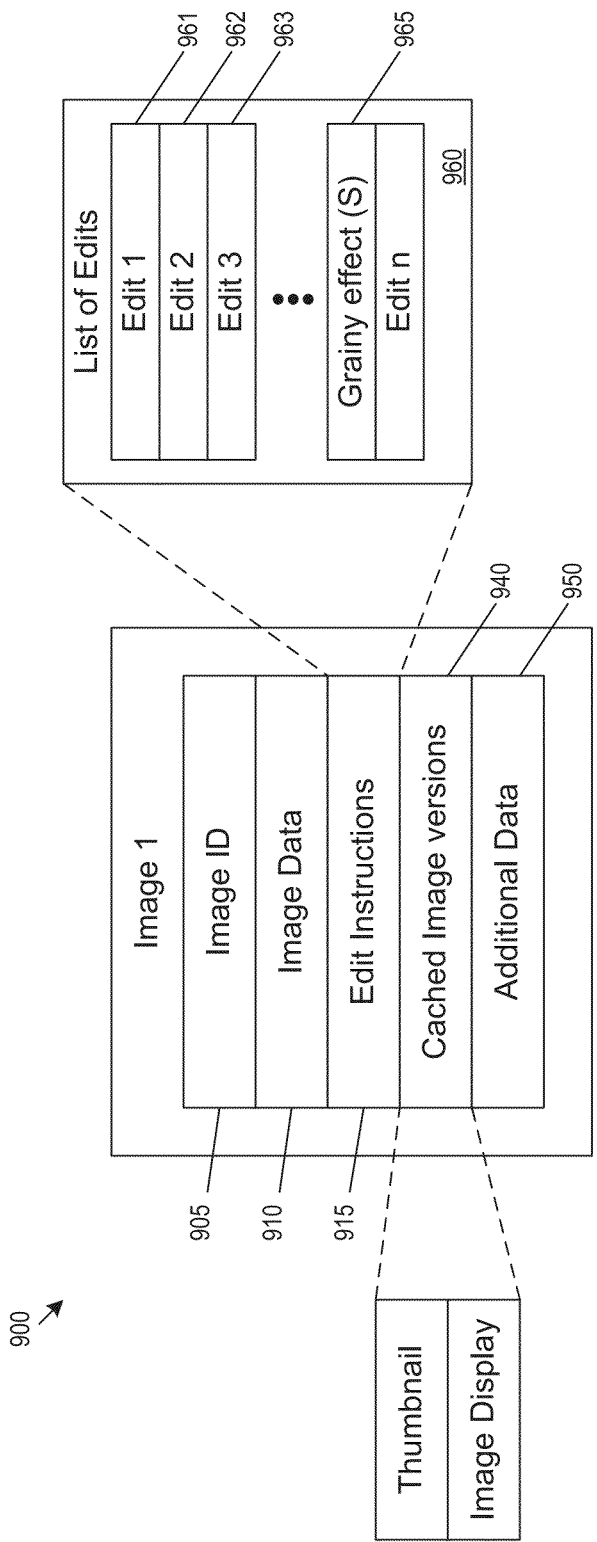
FIG. 9 conceptually illustrates a data structure for an image as stored by the application of some embodiments.

The above-described figures illustrated various examples of the GUI of an image viewing, editing, and organization application of some embodiments. FIG. 8 illustrates a detailed view of a GUI 800 of some embodiments for viewing, editing, and organizing images. The GUI 800 will be described in part by reference to FIG. 9, which conceptually illustrates a data structure 900 for an image as stored by the application of some embodiments.

The data structure 900 includes an image ID 905, image data 910, edit instructions 915, cached versions 940 of the image, and any additional data 950 for the image. The image ID 905 is a unique identifier for the image, which in some embodiments is used by the collection data structures to refer to the images stored in the collection. The image data 910 is the actual full-size pixel data for displaying the image (e.g., a series of color-space channel values for each pixel in the image or an encoded version thereof). In some embodiments, this data may be stored in a database of the image viewing, editing, and organization application, or may be stored with the data of another application on the same device. In some embodiments, this additional application is another image organization application that operates on the device, on top of which the image viewing, editing, and organization operates.

Thus, the data structure may store a pointer to the local file associated with the application or an ID that can be used to query the database of another application. In some embodiments, once the application uses the image in a journal or makes an edit to the image, the application automatically makes a local copy of the image file that contains the image data.

The edit instructions 915 include information regarding any edits the user has applied to the image. In this manner, the application stores the image in a non-destructive format, such that the application can easily revert from an edited version of the image to the original at any time. For instance, the user can apply a grainy effect to the image, leave the application, and then reopen the application and remove the effect at another time. The edits stored in these instructions may be crops and rotations, full-image exposure and color adjustments, localized adjustments, and special effects, as well as other edits that affect the pixels of the image. Some embodiments store these editing instructions in a particular order, so that users can view different versions of the image with only certain sets of edits applied.

In some embodiments, the edit instructions 915 are implemented as a list 960 of edit operations. The list 960 includes edit operations such as edits 961, 962, 963, and 965. Each edit operation in the list 960 specifies the necessary parameters for carrying out the edit operation. For example, the edit operation 965 in the list 960 specifies an edit to the image that applies a grainy effect with user chosen strength S.

In some embodiments, the list 960 records the sequence of edit operations undertaken by the user in order to create the final edited image. In some embodiments, the list 960 stores the edit instructions in the order that the image editing application applies the edits to the image in order to generate an output image for display, as some embodiments define a particular order for the different possible edits provided by the application. For example, some embodiments define grainy effect as one of the edit operations that are to be applied later than other edit operations such as crop and rotation, full-image exposure, and color adjustment. The list 960 of some of these embodiments would store the edit instruction for the grainy effect in a position (i.e., edit 965) that would be applied later than some of the other edit operations (e.g., edits 961-963).

The cached image versions 940 store versions of the image that are commonly accessed and displayed, so that the application does not need to repeatedly generate these images from the full-size image data 910. For instance, the application will often store a thumbnail for the image as well as a display resolution version (e.g., a version tailored for the image display area). The application of some embodiments generates a new thumbnail for an image each time an edit is applied, replacing the previous thumbnail. Some embodiments store multiple display resolution versions including the original image and one or more edited versions of the image.

Finally, the image data structure 900 includes additional data 950 that the application might store with an image (e.g., locations and sizes of faces, etc.). In some embodiments, the additional data can include Exchangeable image file format (Exif) data, caption data, shared image data, tags on the image or any other types of data. Exif data includes various information stored by the camera that are captured the image such as camera settings, GPS data, timestamps, etc. Caption is a user-entered description of the image. Tags are information that the application enables the user to associate with an image such as marking the image as a favorite, flagged, hidden, etc.

One of ordinary skill in the art will recognize that the image data structure 900 is only one possible data structure that the application might use to store the required information for an image. For example, different embodiments might store additional or less information, store the information in a different order, etc.

Returning to FIG. 8, the GUI 800 includes a thumbnail display area 805, an image display area 810, a first toolbar 815, a second toolbar 820, and a third toolbar 825. The thumbnail display area 805 displays thumbnails of the images in a selected collection. Thumbnails are small representations of a full-size image, and represent only a portion of an image in some embodiments. For example, the thumbnails in thumbnail display area 805 are all squares, irrespective of the aspect ratio of the full-size images. In order to determine the portion of a rectangular image to use for a thumbnail, the application identifies the smaller dimension of the image and uses the center portion of the image in the longer direction. For instance, with a 1600×1200 pixel image, the application would use a 1200×1200 square. To further refine the selected portion for a thumbnail, some embodiments identify a center of all the faces in the image (using a face detection algorithm), then use this location to center the thumbnail portion in the clipped direction. Thus, if the faces in the theoretical 1600× 1200 image were all located on the left side of the image, the application would use the leftmost 1200 columns of pixels rather than cut off 200 columns on either side.

After determining the portion of the image to use for the thumbnail, the image-viewing application generates a low resolution version (e.g., using pixel blending and other techniques) of the image. The application of some embodiments stores the thumbnail for an image as a cached version 940 of the image. Thus, when a user selects a collection, the application identifies all of the images in the collection (through the collection data structure), and accesses the cached thumbnails in each image data structure for display in the thumbnail display area.

The user may select one or more images in the thumbnail display area (e.g., through various touch interactions described above, or through other user input interactions). The selected thumbnails are displayed with a highlight or other indicator of selection. In thumbnail display area 805, the thumbnail 830 is selected. In addition, as shown, the thumbnail display area 805 of some embodiments indicates a number of images in the collection that have been flagged (e.g., having a tag for the flag set to yes). In some embodiments, this text is selectable in order to display only the thumbnails of the flagged images.

The application displays selected images in the image display area 810 at a larger resolution than the corresponding thumbnails. The images are not typically displayed at the full size of the image, as images often have a higher resolution than the display device. As such, the application of some embodiments stores a cached version 940 of the image designed to fit into the image display area. Images in the image display area 810 are displayed in the aspect ratio of the full-size image. When one image is selected, the application displays the image as large as possible within the image display area without cutting off any part of the image. When multiple images are selected, the application displays the images in such a way as to maintain their visual weighting by using approximately the same number of pixels for each image, even when the images have different aspect ratios.

The first toolbar 815 displays title information (e.g., the name of the collection shown in the GUI, a caption that a user has added to the currently selected image, etc.). In addition, the toolbar 815 includes a first set of GUI items 835-838 and a second set of GUI items 840-843.

The first set of GUI items includes a back button 835, a grid button 836, a help button 837, and an undo button 838. The back button 835 enables the user to navigate back to a collection organization GUI, from which users can select between different collections of images (e.g., albums, events, journals, etc.). Selection of the grid button 836 causes the application to move the thumbnail display area on or off of the GUI (e.g., via a slide animation). In some embodiments, users can also slide the thumbnail display area on or off of the GUI via a swipe gesture. The help button 837 activates a context-sensitive help feature that identifies a current set of tools active for the user and provides help indicators for those tools that succinctly describe the tools to the user. In some embodiments, the help indicators are selectable to access additional information about the tools. Selection of the undo button 838 causes the application to remove the most recent edit to the image, whether this edit is a crop, color adjustment, etc. In order to perform this undo, some embodiments remove the most recent instruction from the set of edit instructions 915 stored with the image.

The second set of GUI items includes a sharing button 840, an information button 841, a show original button 842, and an edit button 843. The sharing button 840 enables a user to share an image in a variety of different ways. In some embodiments, the user can send a selected image to another compatible device on the same network (e.g., WiFi or Bluetooth network), upload an image to an image hosting or social media website, and create a journal (i.e., a presentation of arranged images to which additional content can be added) from a set of selected images, among others.

The information button 841 activates a display area that displays additional information about one or more selected images. The information displayed in the activated display area may include some or all of the Exif data stored for an image (e.g., camera settings, timestamp, etc.). When multiple images are selected, some embodiments only display Exif data that is common to all of the selected images. Some embodiments include additional tabs within the information display area for (i) displaying a map showing where the image or images were captured according to the GPS data, if this information is available and (ii) displaying comment streams for the image on any photo sharing websites. To download this information from the websites, the application uses the object ID stored for the image with the shared image data and sends this information to the website. The comment stream and, in some cases, additional information, are received from the website and displayed to the user.

The show original button 842 enables the user to toggle between the original version of an image and the current edited version of the image. When a user selects the button, the application displays the original version of the image without any of the editing instructions 915 applied. In some embodiments, the appropriate size image is stored as one of the cached versions 940 of the image, making it quickly accessible. When the user selects the button again 842 again, the application displays the edited version of the image, with the editing instructions 915 applied.

The edit button 843 allows the user to enter or exit edit mode. When a user has selected one of the sets of editing tools in the toolbar 820, the edit button 843 returns the user to the viewing and organization mode, as shown in FIG. 8. When the user selects the edit button 843 while in the viewing mode, the application returns to the last used set of editing tools in the order shown in toolbar 820. That is, the items in the toolbar 820 are arranged in a particular order, and the edit button 843 activates the rightmost of those items for which edits have been made to the selected image.

The toolbar 820, as mentioned, includes five items 845-849, arranged in a particular order from left to right. The crop item 845 activates a cropping and rotation tool that allows the user to align crooked images and remove unwanted portions of an image. The exposure item 846 activates a set of exposure tools that allow the user to modify the black point, shadows, contrast, brightness, highlights, and white point of an image. In some embodiments, the set of exposure tools is a set of sliders that work together in different combinations to modify the tonal attributes of an image. The color item 847 activates a set of color tools that enable the user to modify the saturation and vibrancy, as well as color-specific saturations (e.g., blue pixels or green pixels) and white balance. In some embodiments, some of these tools are presented as a set of sliders. The brushes item 848 activates a set of enhancement tools that enable a user to localize modifications to the image. With the brushes, the user can remove red-eye and blemishes, and apply or remove saturation and other features to localized portions of an image by performing a rubbing action over the image. Finally, the effects item 849 activates a set of special effects that the user can apply to the image. These effects include duotone effect, grainy effect, gradients, tilt shifts, non-photorealistic desaturation effects, grayscale effects, various filters, etc. In some embodiments, the application presents these effects as a set of items that fan out from the toolbar 825.

As stated, the UI items 845-849 are arranged in a particular order. This order follows the order in which users most commonly apply the five different types of edits. Accordingly, the editing instructions 915 are stored in this same order, in some embodiments. When a user selects one of the items 845-849, some embodiments apply only the edits from the tools to the left of the selected tool to the displayed image (though other edits remain stored within the instruction set 915).

The toolbar 825 includes a set of GUI items 850-854 as well as a settings item 855. The auto-enhance item 850 automatically performs enhancement edits to an image (e.g., removing apparent red-eye, balancing color, etc.). The rotation button 851 rotates any selected images. In some embodiments, each time the rotation button is pressed, the image rotates 90 degrees in a particular direction. The auto-enhancement, in some embodiments, comprises a predetermined set of edit instructions that are placed in the instruction set 915. Some embodiments perform an analysis of the image and then define a set of instructions based on the analysis. For instance, the auto-enhance tool will attempt to detect red-eye in the image, but if no red-eye is detected then no instructions will be generated to correct it. Similarly, automatic color balancing will be based on an analysis of the image. The rotations generated by the rotation button are also stored as edit instructions.

The flag button 852 tags any selected image as flagged. In some embodiments, the flagged images of a collection can be displayed without any of the unflagged images. The favorites button 853 allows a user to mark any selected images as favorites. In some embodiments, this tags the image as a favorite and also adds the image to a collection of favorite images. The hide button 854 enables a user to tag an image as hidden. In some embodiments, a hidden image will not be displayed in the thumbnail display area and/or will not be displayed when a user cycles through the images of a collection in the image display area. As discussed above by reference to FIG. 9, many of these features are stored as tags in the image data structure.

Finally, the settings button 855 activates a context-sensitive menu that provides different menu options depending on the currently active toolset. For instance, in viewing mode the menu of some embodiments provides options for creating a new album, setting a key photo for an album, copying settings from one photo to another, and other options. When different sets of editing tools are active, the menu provides options related to the particular active toolset.

One of ordinary skill in the art will recognize that the image viewing and editing GUI 800 is only one example of many possible graphical user interfaces for an image viewing, editing, and organizing application. For instance, the various items could be located in different areas or in a different order, and some embodiments might include items with additional or different functionalities. The thumbnail display area of some embodiments might display thumbnails that match the aspect ratio of their corresponding full-size images, etc.

IV. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 10:
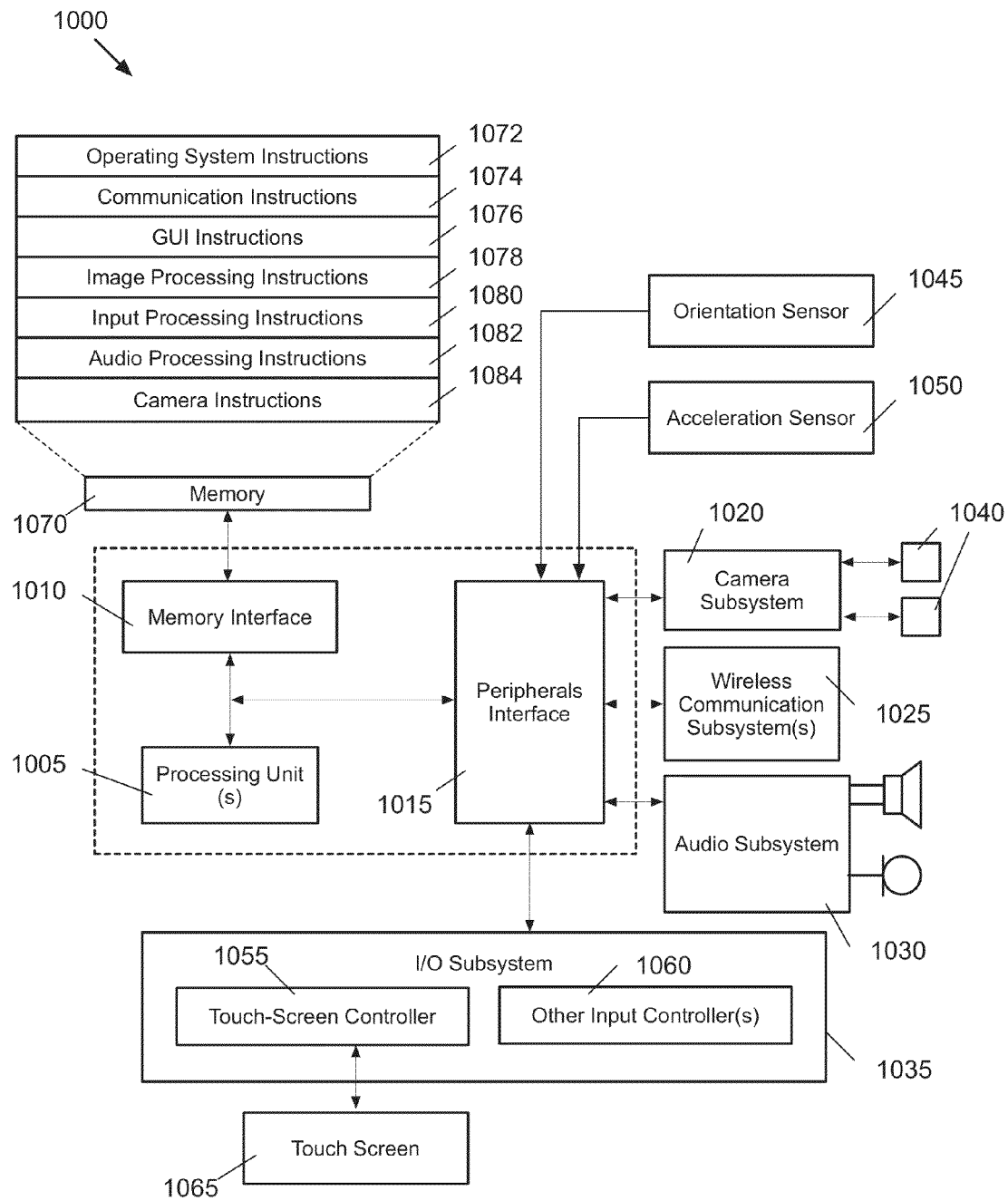
FIG. 10 illustrates an example of an architecture of a mobile computing device that supports an image editing and viewing applications.

The image editing and viewing applications of some embodiments operate on mobile devices. FIG. 10 is an example of an architecture 1000 of such a mobile computing device. Examples of mobile computing devices include smartphones, tablets, laptops, etc. As shown, the mobile computing device 1000 includes one or more processing units 1005, a memory interface 1010 and a peripherals interface 1015.

The peripherals interface 1015 is coupled to various sensors and subsystems, including a camera subsystem 1020, a wireless communication subsystem(s) 1025, an audio subsystem 1030, an I/O subsystem 1035, etc. The peripherals interface 1015 enables communication between the processing units 1005 and various peripherals. For example, an orientation sensor 1045 (e.g., a gyroscope) and an acceleration sensor 1050 (e.g., an accelerometer) is coupled to the peripherals interface 1015 to facilitate orientation and acceleration functions.

The camera subsystem 1020 is coupled to one or more optical sensors 1040 (e.g., a charged coupled device (CCD) optical sensor, a complementary metal-oxide-semiconductor (CMOS) optical sensor, etc.). The camera subsystem 1020 coupled with the optical sensors 1040 facilitates camera functions, such as image and/or video data capturing. The wireless communication subsystem 1025 serves to facilitate communication functions. In some embodiments, the wireless communication subsystem 1025 includes radio frequency receivers and transmitters, and optical receivers and transmitters (not shown in FIG. 10). These receivers and transmitters of some embodiments are implemented to operate over one or more communication networks such as a GSM network, a Wi-Fi network, a Bluetooth network, etc. The audio subsystem 1030 is coupled to a speaker to output audio (e.g., to output different sound effects associated with different image operations). Additionally, the audio subsystem 1030 is coupled to a microphone to facilitate voice-enabled functions, such as voice recognition, digital recording, etc.

The I/O subsystem 1035 involves the transfer between input/output peripheral devices, such as a display, a touch screen, etc., and the data bus of the processing units 1005 through the peripherals interface 1015. The I/O subsystem 1035 includes a touch-screen controller 1055 and other input controllers 1060 to facilitate the transfer between input/output peripheral devices and the data bus of the processing units 1005. As shown, the touch-screen controller 1055 is coupled to a touch screen 1065. The touch-screen controller 1055 detects contact and movement on the touch screen 1065 using any of multiple touch sensitivity technologies. The other input controllers 1060 are coupled to other input/control devices, such as one or more buttons. Some embodiments include a near-touch sensitive screen and a corresponding controller that can detect near-touch interactions instead of or in addition to touch interactions.

The memory interface 1010 is coupled to memory 1070. In some embodiments, the memory 1070 includes volatile memory (e.g., high-speed random access memory), non-volatile memory (e.g., flash memory), a combination of volatile and non-volatile memory, and/or any other type of memory. As illustrated in FIG. 10, the memory 1070 stores an operating system (OS) 1072. The OS 1072 includes instructions for handling basic system services and for performing hardware dependent tasks.

The memory 1070 also includes communication instructions 1074 to facilitate communicating with one or more additional devices; graphical user interface instructions 1076 to facilitate graphic user interface processing; image processing instructions 1078 to facilitate image-related processing and functions; input processing instructions 1080 to facilitate input-related (e.g., touch input) processes and functions; audio processing instructions 1082 to facilitate audio-related processes and functions; and camera instructions 1084 to facilitate camera-related processes and functions. The instructions described above are merely exemplary and the memory 1070 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 10 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 10 may be split into two or more integrated circuits.

B. Computer System

Figure 11:
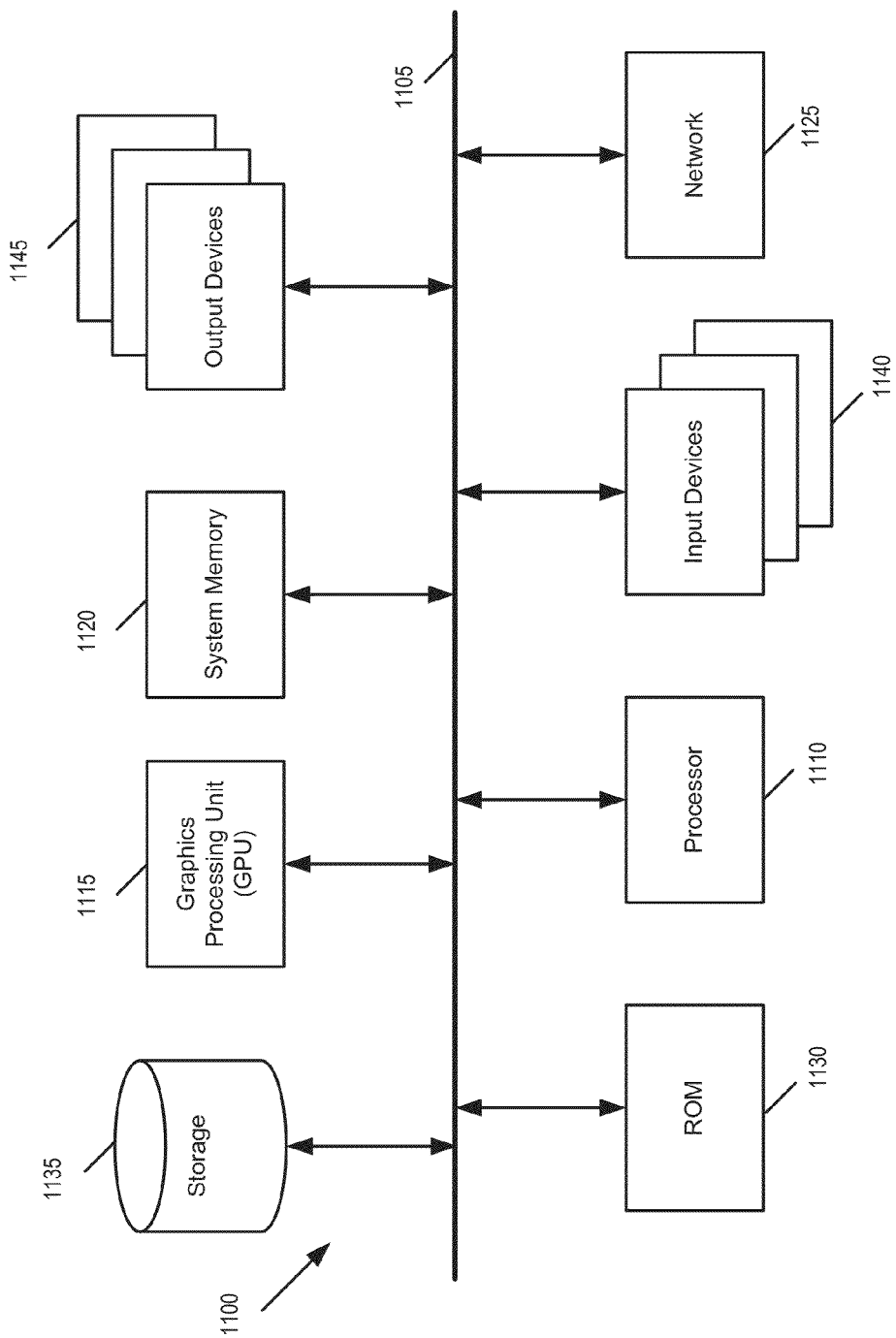
FIG. 11 conceptually illustrates another example of an electronic system with which some embodiments of the invention are implemented.

FIG. 11 conceptually illustrates another example of an electronic system 1100 with which some embodiments of the invention are implemented. The electronic system 1100 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1100 includes a bus 1105, processing unit(s) 1110, a graphics processing unit (GPU) 1115, a system memory 1120, a network 1125, a read-only memory 1130, a permanent storage device 1135, input devices 1140, and output devices 1145.

The bus 1105 collectively represents all system, peripheral, and chip set buses that communicatively connect the numerous internal devices of the electronic system 1100. For instance, the bus 1105 communicatively connects the processing unit(s) 1110 with the read-only memory 1130, the GPU 1115, the system memory 1120, and the permanent storage device 1135.

From these various memory units, the processing unit(s) 1110 retrieves instructions to execute and data to process in order to execute the processes of the invention. The processing unit(s) may be a single processor or a multi-core processor in different embodiments. Some instructions are passed to and executed by the GPU 1115. The GPU 1115 can offload various computations or complement the image processing provided by the processing unit(s) 1110. In some embodiments, such functionality can be provided using CoreImage's kernel shading language.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash memory device, etc., and its corresponding drive) as the permanent storage device Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor needs at runtime. In some embodiments, the invention's processes are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, a number of the figures (including FIG. 2) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

In addition, controls for setting the single adjustment value used to perform different image editing operations are shown as slider controls in FIGS. 5-6. The sliders of such embodiments provide a visual indication of a setting value as a knob is slid along the slider to set a value for the slider. However, in some embodiments, the slider controls shown in any of those figures could be replaced with any other control capable of receiving a value (e.g., a single value), such as a vertical slider control, a pull down menu, a value entry box, an incremental tool activated by keyboard keys, other range related UI controls (e.g., dials, buttons, number fields, and the like), etc. Similarly, the slider controls of those figures are either depicted as being set with a finger gesture (e.g., placing, pointing, tapping one or more fingers) on a touch sensitive screen or simply shown in a position without any indication of how they were moved into position. One of ordinary skill in the art will understand that the controls of FIGS. 5-6 can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

The invention claimed is:

1. A non-transitory machine readable medium storing a computer program that is executable by at least one processing unit, the computer program comprising sets of instructions for:
receiving a subject image;
providing a background grain image;
blending the background grain image and the subject image to produce a blended image; and
producing a final grainy image based on the blended image, wherein visibility of graininess in the final grainy image is determined by brightness in the received subject image.

2. The non-transitory machine readable medium of claim 1, wherein the set of instructions for producing the blended image comprises a set of instructions for producing a bias-free background grain image by removing a positive bias from the provided background grain image.

3. The non-transitory machine readable medium of claim 2, wherein the set of instructions for producing a bias-free background grain image by removing a positive bias from the provided background grain image comprises sets of instructions for:
computing an average value of all pixel values of the provided background grain image; and
subtracting the average value from each of the pixel values of the provided background grain image.

4. The non-transitory machine readable medium of claim 1, wherein an average value of all pixel values of the provided background grain image is approximately zero.

5. The non-transitory machine readable medium of claim 1, wherein the set of instructions for blending the background grain image and the subject image comprises sets of instructions for performing a multiplicative blending and an additive blending.

6. The non-transitory machine readable medium of claim 5, wherein the set of instructions for performing the multiplicative blending comprises a set of instructions for multiplying pixel values of the subject image by pixel values of a bias-free background grain image.

7. The non-transitory machine readable medium of claim 5, wherein the multiplicative blending causes graininess to appear invisible in black regions of the final grainy image.

8. The non-transitory machine readable medium of claim 5, wherein the set of instructions for performing the additive blending comprises a set of instructions for adding pixel values of the subject image to pixel values based on a weighted result of the multiplicative blending.

9. The non-transitory machine readable medium of claim 8, wherein the weighted result of the multiplicative blending is based on a user selected strength factor.

10. The non-transitory machine readable medium of claim 1, wherein the set of instructions for producing the final grainy image comprises a set of instructions for multiplying pixel values in the blended image with complement values of pixel values in the subject image.

11. The non-transitory machine readable medium of claim 1, wherein the set of instructions for producing the final grainy image comprises a set of instructions for reducing visibility of graininess in brighter regions of the subject image.

12. A system comprising:
a set of processing units for executing sets of instructions;
a memory for storing a program which when executed by at least one of the processing units edits images, the program comprising sets of instructions for:
storing a subject image and a background grain image;
blending the background grain image and the subject image to produce a blended image; and
producing a final grainy image based on the blended image, wherein visibility of graininess in the final grainy image is determined by brightness levels in the subject image.

13. The system of claim 12, wherein the set of instructions for blending comprises a set of instructions for removing a positive bias from the stored background grain image.

14. The system of claim 13, wherein the set of instructions for removing comprises a set of instructions for subtracting an average pixel value of the background grain image from pixel values in the background grain image.

15. The system of claim 12, wherein the set of instructions for blending comprises a set of instructions for performing a multiplicative blending and an additive blending.

16. The system of claim 15, wherein the set of instructions for performing multiplicative blending comprises a set of instructions for multiplying pixel values of the subject image with pixel values of a bias-free background grain image.

17. The system of claim 15, wherein the multiplicative blending causes graininess to appear invisible in black regions of the final grainy image.

18. The system of claim 15, wherein the set of instructions for performing additive blending comprises a set of instructions for adding pixel values of the subject image with pixel values with a weighted result of the multiplicative blending.

19. The system of claim 18, wherein the weighted result of the multiplicative blending is based on a user chosen strength.

20. The system of claim 12, wherein the set of instructions for producing the final grainy image comprises a set of instructions for multiplying pixels values in the blended image with complement values of pixel values in the subject image.

21. The system of claim 12, wherein the set of instructions for producing the final grainy image comprises a set of instructions for reducing the visibility of graininess in brighter regions of the subject image.

22. A non-transitory machine readable medium storing an image editing application for execution by at least one processing unit, the image editing application comprises a user interface (UI), the UI comprising:
a user selectable item for receiving a user chosen graininess strength;
a graininess effects tool for generating a final grainy image from a subject image and a background grain image, wherein graininess in the final grainy image is determined by the received user chosen graininess strength, wherein the graininess effects tool controls a visibility of graininess based on a brightness level of the subject image; and an image viewing area for displaying the final grainy image.

23. The non-transitory machine readable medium of claim 22, wherein the background grain image is a bias-free background grain image.

24. The non-transitory machine readable medium of claim 22, wherein the background grain image has an average pixel value of zero.

25. The non-transitory machine readable medium of claim 22, wherein the graininess effects tool makes white regions in the final grainy image appear grain free.

26. The non-transitory machine readable medium of claim 22, wherein the graininess effects tool makes black regions in the final grainy image appear grain free.

* * * * *